United States Patent
DeLuca

(10) Patent No.: US 10,827,328 B2
(45) Date of Patent: Nov. 3, 2020

(54) MOBILE HOTSPOT MANAGEMENT IN AUTOMOBILE-EMBEDDED DIGITAL ASSISTANT ENVIRONMENT

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/205,685

(22) Filed: Nov. 30, 2018

(65) Prior Publication Data
US 2020/0178050 A1 Jun. 4, 2020

(51) Int. Cl.
*H04W 4/48* (2018.01)
*H04W 4/30* (2018.01)
*H04W 76/14* (2018.01)
*H04W 4/20* (2018.01)
*H04W 88/04* (2009.01)

(52) U.S. Cl.
CPC ............ *H04W 4/48* (2018.02); *H04W 4/20* (2013.01); *H04W 76/14* (2018.02); *H04W 88/04* (2013.01)

(58) Field of Classification Search
CPC .......... H04W 4/00; H04W 4/30; H04W 4/33; H04W 4/40–48; H04W 4/80
See application file for complete search history.

(56) References Cited

U.S. PATENT DOCUMENTS

| | | | |
|---|---|---|---|
| 9,386,136 B2 | 7/2016 | Barrett et al. | |
| 9,913,175 B2 | 3/2018 | Cabral et al. | |
| 2012/0039248 A1* | 2/2012 | Schneider | H04W 84/005 370/328 |
| 2013/0055096 A1* | 2/2013 | Kim | B60K 35/00 715/738 |
| 2013/0182693 A1* | 7/2013 | Sperling | H04W 52/0229 370/338 |
| 2014/0269649 A1 | 9/2014 | Lockerbie | |

(Continued)

FOREIGN PATENT DOCUMENTS

CN 102378314 B 12/2016

OTHER PUBLICATIONS

Garmin®, "Garmin Speak™ with Amazon Alexa", printed Sep. 11, 2010, 8 pages, https://buy.garmin.com/en-US/US/p591054 see manual here: https://images-na.sa1-images-amazon.com/images/I/B1mLW9EYK1S.pdf, Best Available by manual : Feb. 2018.

*Primary Examiner* — San Htun
(74) *Attorney, Agent, or Firm* — James W. Kappos

(57) ABSTRACT

A vehicle-embedded digital assistant interacts with mobile devices using an in-vehicle mobile hotspot. The in-vehicle mobile hotspot is managed according to a method that is, in one embodiment, performed in whole or in part by the digital assistant. For example, the digital assistant detects an engagement from/by a mobile device. The digital assistant determines that responding to the engagement requires use of a network connection. The digital assistant determines that at least one mobile device is capable of providing a mobile hotspot to share its network connection. The digital assistant connects to the hotspot of the at least one mobile device.

16 Claims, 3 Drawing Sheets

(56) References Cited

U.S. PATENT DOCUMENTS

2015/0173112 A1* 6/2015 Cui .................. H04L 63/08
 370/329
2016/0381717 A1 12/2016 Sunagar et al.
2017/0150531 A1* 5/2017 Horbatt ............. H04W 24/02

* cited by examiner

MOBILE HOTSPOT MANAGEMENT IN AUTOMOBILE-EMBEDDED DIGITAL ASSISTANT ENVIRONMENT

BACKGROUND

Embodiments of the invention generally relate to computer systems, and more specifically to interconnected devices in an Internet of Things (IoT) environments.

Digital assistants (also referred to as "digital personal assistants" or "virtual assistants") are becoming an important functional component of Internet of Things (IoT) networks, with many major technology firms offering their own versions branded with proper names. These digital personal assistants may be integrated into various devices such as automobiles, smart phones, smart watches, personal computers, or may function via a dedicated device. The digital personal assistants may be activated via voice commands, among other methods, and may perform various tasks like performing a financial transaction, playing music, executing an Internet search, or interacting with another IoT device (for example, turning lights on/off).

SUMMARY

Embodiments of the invention generally are directed to methods, computer program products, and computer systems for managing an in-vehicle mobile hotspot based on interactions of a vehicle-embedded digital assistant with mobile devices.

According to an embodiment of the invention, a vehicle-embedded digital assistant interacts with mobile devices using an in-vehicle mobile hotspot. The in-vehicle mobile hotspot is managed according to a method that is, in one embodiment, performed in whole or in part by the digital assistant. For example, the digital assistant detects an engagement from/by a mobile device. The digital assistant determines that responding to the engagement requires use of a network connection. The digital assistant determines that at least one mobile device is capable of providing a mobile hotspot to share its network connection. The digital assistant connects to the hotspot of the at least one mobile device.

According to a related embodiment, the digital assistant also processes the engagement, via the mobile hotspot, using the network connection.

According to a related embodiment, the engagement comprises one or more programming instructions, and the digital assistant also executing at least one programming instruction of the engagement.

According to a related embodiment, the digital assistant determines that no network connection is available to an engaging mobile device.

According to a related embodiment, the digital assistant determines that no network connection is available to the digital assistant.

According to a related embodiment, the digital assistant determining that no preferred network connection or no suitable network connection is available to either or both of an engaging mobile device and the digital assistant.

According to a related embodiment, the digital assistant communicates a request to the at least one mobile device to prompt a user to enable the mobile hotspot of the at least one mobile device.

According to a related embodiment, the digital assistant communicates an instruction to the at least one mobile device to enable the mobile hotspot of the at least one mobile device automatically.

According to a related embodiment, the digital assistant disconnects from the mobile hotspot.

According to a related embodiment, the digital assistant disables the mobile hotspot.

According to a related embodiment, the digital assistant communicates an instruction to the at least one mobile device to disable the mobile hotspot.

According to a related embodiment, the digital assistant determines that at least two mobile devices, including the at least one mobile device, have a network connection and each are capable of providing a mobile hotspot, and the digital assistant selects, for mobile hotspot activation, only one of the at least two mobile devices.

According to a related embodiment, disabling the mobile hotspot or causing the disabling of the mobile hotspot, by the digital assistant, is based on any one of:

a connected mobile device or the digital assistant disconnecting from the mobile hotspot;

a period of mobile device inactivity or digital assistant inactivity using the mobile hotspot;

detecting a specific travel route of the vehicle;

detecting the at least one mobile device being used by another mobile device;

detecting intermittent network connection on the at least one mobile device;

detecting potential roaming by the at least one mobile device;

detecting data usage reaching a threshold on the at least one mobile device; or detecting a voice command from user.

According to a related embodiment, disabling the mobile hotspot, or causing disabling of the mobile hotspot, by the digital assistant, is based on detecting restoration of a network connection of the digital assistant.

According to a further embodiment of the invention, the above functions are performed via programming instructions stored on a tangible storage medium of a computer having a processor capable of executing the programming instructions, whereby execution of the programming instructions performs one or more of the above-listed functions.

According to a further embodiment of the invention, the above functions are performable via programming instructions stored on a tangible storage medium, that when executed by a processor of a computer, perform one or more of the above-listed functions.

DETAILED DESCRIPTION

Many functions of a digital assistant require IoT network connectivity. The network may be the Internet, a cellular network, a satellite network, a virtual private network, or any other standard or custom network known in the art.

Some examples of functions by the digital assistant that may rely on network connectivity include, without limitation: receiving and interpreting user commands or instructions (for example, audio commands) to be performed on a device on which the digital assistant is embedded; searching for and retrieving information; communicating instructions/information to or receiving instructions/information from another IoT device; and other functions.

A problem with the state of the art with respect to a vehicle-embedded digital assistant is the potential lack of network connectivity, or a lack of preferred or desired connectivity, by one or more in-vehicle devices, including the digital assistant and/or mobile devices in the vehicle. This is a problem recognized and appreciated by the inventor of Applicant's claimed invention. For example, in a vehicle that has no Internet connection, a user's (for example, a driver or passenger) access to information and the ability to perform certain actions using the digital assistant are limited. For instance, a digital assistant lacking connectivity cannot process user commands that require server-side processing (e.g., interpreting the command); or to execute commands on remote servers or devices (remote relative to the vehicle), such as conducting an Internet search. Similarly, a user wishing to operate the user's mobile device may have limited or no functionality if the device is not connected to a network, or if an existing connection is not suitable or desirable (for example, because it is slow, or is subject to data usage charges or caps).

Therefore, it would be advantageous to implement a solution whereby the lack of connection, or lack of a preferred or desired connection, by one or more in-vehicle devices including a digital assistant, is addressed. According to some embodiments of the invention, some such solutions may use a mobile hotspot of at least one in-vehicle device to the benefit of other devices.

Accordingly, embodiments of the invention generally are directed to computer-implemented methods, computer program products, and systems for managing an in-vehicle mobile hotspot based on interactions of a vehicle-embedded digital assistant with mobile devices. Generally, some embodiments of the invention may operate by connecting to a hotspot connection of a user device to access an IoT network (such as the Internet). In some embodiments, the digital assistant may extend the hotspot connection of one user device to other user devices not directly connected to the one user device.

Exemplary and illustrative embodiments of the invention will now be described in greater detail in connection with the Figures.

Figure 1:
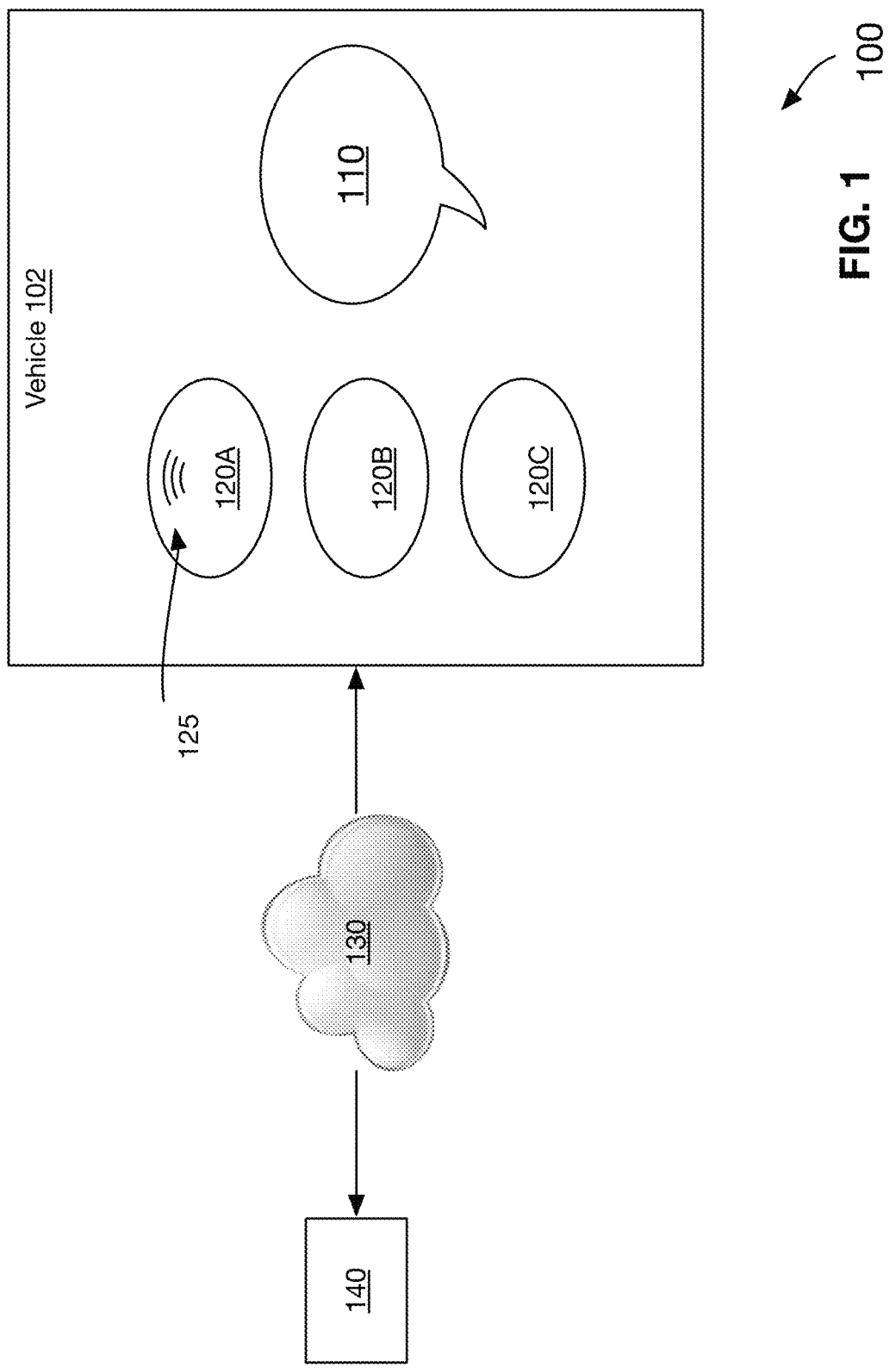
FIG. 1 is a functional block diagram of an illustrative environment 100 for managing an in-vehicle mobile hotspot based on interactions of a vehicle-embedded digital assistant with mobile devices, according to an embodiment of the invention.

FIG. 1 is a functional block diagram of an illustrative vehicle travel environment 100 ("environment 100") for managing an in-vehicle mobile hotspot based on interactions of a vehicle-embedded digital assistant with mobile devices, according to an embodiment of the invention. Descriptions of the depicted embodiment should not be construed to limit the scope of the invention, which is defined by the claims.

According to the depicted embodiment, environment 100 includes a vehicle 102 capable of travelling from one location to another (i.e., capable of not being stationary). Vehicle 102 may be, for example, a car, a boat, or a plane. These are merely examples.

Environment 100 also includes a network 130 and one or more remote devices/servers 140.

According to an embodiment, network 130 may be a single network or a collection of various networks operable between shared or distinct sets of physical and virtual devices using the same or different communication protocols. For example, network 130 may the Internet, a cellular network, and/or a satellite network, or a virtual network (these may be wireless and/or wired where physically feasible). Various physical or virtual devices in these networks may be grouped together to define an IoT network of interconnected devices. Network 130 is shown, in FIG. 1, as connected to vehicle 102. This depiction is intended to show that any one or more of digital assistant 110 and mobile devices 120 may individually or collectively, and directly or indirectly, be connected to network 130.

Vehicle 102 includes a digital assistant 110. In an embodiment, digital assistant 110 is embedded as a software and/or hardware component of a computing device of vehicle 110. For example, digital assistant 110 may be a software program embodied on a tangible storage device of a computer in vehicle 110 (and accessible, for example, and without limitation, via a multimedia system of the vehicle). Executing programming instructions of the software program by a processor of the computer may implement various methods. The in-vehicle computer may be any general computing device or a specialized computing device; aspects of which are described in connection with FIG. 3 below. In particular, the computing device may include one or more wired and/or wireless communication components that connect to various mobile devices and one or more networks, via for example, the Internet, cellular networks, satellite networks, and/or IoT networks. In an embodiment, a connection to an IoT network may be enabled via the Internet, cellular networks, satellite networks.

At any given time, vehicle 102 may contain one or more user devices, referred to as mobile devices 120 (such as mobile device 120A, mobile device 120B, and mobile device 120C). Mobile devices 120 may include smartphones, music players, smart watches, laptops, tablets, or other computing devices whose operation allows them to function in a non-stationary manner, if desired by their users, in the ordinary course of the devices' use. Mobile devices 120 may have direct or indirect connectivity to one or more networks, via for example, the Internet, cellular networks, satellite networks, and/or IoT networks, via any known communication protocol known in the art (for example, WiFi). In an embodiment, a connection to an IoT network may be enabled via the Internet, cellular networks, satellite networks.

Some of mobile devices 120 may be capable of establishing a mobile hotspot via tethering, and some may have no such mobile hotspot. In the depicted example, mobile device 120A has a mobile hotspot 125. Tethering generally refers to mechanisms and processes by which a device having a connection to a network shares that connection (or at least, makes it available for sharing) with other devices. The term tethering typically refers to sharing a phone's connection with another electronic device. However, the fundamental process of sharing any device's connection with another device are also contemplated in some embodiments of the invention.

Sharing of a mobile hotspot connection may be done using various mechanisms including, for example, wireless LAN (for example, Wi-Fi), Bluetooth®, or a physical connection such as a wire. Other modes of connectivity are possible according to any manner known in the art.

Mobile device 120A may share mobile hotspot 125 automatically, or upon receiving a and approving a share request. In an embodiment, mobile device 120A approves a share request based on prompting a user, via a graphical user interface (GUI), that a share request has been received, and receiving an input from a user to approve the request. In response to receiving the approval input from the user, mobile device 120A may share mobile hotspot 125 by activating a shared connection signal to which other user devices can connect.

Once shared via mobile hotspot 125, the connection of mobile device 120 may be made available to any connected to device (for example, by broadcasting the hotspot signal). For instance, if and once connected to mobile hotspot 125, any of digital assistant 110, mobile device 120B, and/or mobile device 120C may connect to any network or device (for example, network 130 or device 140) accessible via the connection of mobile device 120.

With continued reference to FIG. 1, according to an embodiment of the invention, mobile device 120B has no network connectivity. Mobile device 120C has network connectivity, but the connection is not suitable or ideal. For example, a cellular connection of mobile device 120C may be throttled by a cellular network operator during a billing cycle (for example a month) when mobile device 120C has exceeded the communication bandwidth allotted to that mobile device under a service agreement. In another scenario, the connection of mobile device 120C may be subject to roaming charges where mobile device 120C is located outside of predefined geographic coverage area; use of a default network connection of mobile device 120C might, therefore, incur roaming charges; this might make the default connection unsuitable or non-preferred. In another scenario, mobile device 120C may have a weak connection. In some embodiments, digital assistant 110 may lack a direct connection to network 130 (similar to mobile device 120B) or lack a suitable or preferred connection to network 130 (similar to mobile device 120C).

In an embodiment of the invention, digital assistant 110 engages with mobile devices 120 to perform one or more actions. These actions may include receiving and sending electronic commands (for example, software instructions); interpreting commands; and executing commands. Engaging with a mobile device 120 may include connecting to the device and communicating information with that device. Performing or executing some such actions may require access to network 130.

In an embodiment, digital assistant 110 determines that either or both of digital assistant 110 and a particular mobile device 120 (such as mobile device 120B or mobile device 120C) lacks a direct or a suitable or preferred connection to network 130. In order to execute the actions necessitated by the engagement with a particular mobile device 120, digital assistant 110 determines that at least one mobile device 120 has a connection to network 130. For example, digital assistant 110 determines that mobile device 120A has a direct or preferred access to network 130. Digital assistant 110 also determines that mobile device 120A has a mobile hotspot 125 that, once enabled, can be connected to and used by digital assistant 110 and/or mobile device 120B and/or mobile device 120C to execute pending engagement actions (in an embodiment, the hotspot may already have been activated prior to the need for sharing the connection arises). For instance, if the engagement is between mobile device 120B and digital assistant 110 and the pending action is to search the Internet for some information, the pending action can be performed by digital assistant 110 using mobile hotspot 125. Alternatively, the pending action can be performed by mobile device 120B itself.

In an embodiment, digital assistant 110 facilitates connectivity between mobile device 120B or mobile device 120C to mobile hotspot 125 of mobile device 120A, but does not itself perform all engagement actions. In another embodiment, digital assistant 110 facilitates connectivity between mobile device 120B or mobile device 120C to mobile hotspot 125 of mobile device 120A, but does not itself perform any engagement actions. Facilitating connectivity may include, for example, any one of the following actions: activating mobile hotspot 125 (directly or via an instruction to mobile device 120A); communicating identifying information about mobile hotspot 125 to mobile device 120B or mobile device 120C; authenticating mobile device 120B or mobile device 120C via a security protocol; acting as a gateway or bridge between mobile hotspot 125 and mobile device 120B or mobile device 120C (such that the mobile devices are not directly connected to mobile hotspot 125, and are merely using its connectivity to network 130 via their connection to digital assistant 110). The latter embodiment may be useful in circumstances (this is only one example) where it is not desirable for two mobile devices to be connected to one another directly. For example, in a ride-sharing vehicle where users are passengers who might not know one another, they may permit digital assistant 110 to connect to their mobile hotspot but not wish to permit mobile devices of strangers to connect directly to their phone or its hotspot.

In an embodiment, digital assistant 110 communicates a request to mobile device 120A to prompt the latter's user to enable mobile hotspot 125. In response to enablement of mobile hotspot 125 by the user, digital assistant 110 connects to mobile hotspot 125; and/or facilitates connection to mobile hotspot 125 by mobile device 120B or mobile device 120C.

In an embodiment, digital assistant 110 communicates an instruction to mobile device 120A to enable its mobile hotspot 125 automatically (for example, without requiring the user's approval via a prompt). In a related embodiment, sending the instruction for automatic enablement may be limited, on mobile device 120A, may be conditional on digital assistant 110 being pre-approved or pre-registered. The approval may be limited in time, geographical location, connection type, or instruction type (for example, digital assistant 110 may be approved to connect automatically for finding directions but not for searching the web or processing electronic payments).

In an embodiment, digital assistant 110 may disconnect from mobile hotspot 125. In a related embodiment, digital assistant 110 may cause mobile device 120B or mobile device 120C to disconnect from mobile hotspot 125. In a related embodiment, digital assistant 110 may stop or limit access to its own connection to mobile hotspot 125 by mobile device 120B or mobile device 120C (for example, in the case of limiting access, digital assistant 110 may limit the type of actions, or circumstances in which some actions, are performable via mobile hotspot 125).

In an embodiment, digital assistant 110 communicates an instruction to mobile device 120A to enable its mobile hotspot 125 automatically (for example, without requiring the user's approval via a prompt).

In an embodiment, digital assistant 110 determines that more than one mobile device has a mobile hotspot available. Digital assistant 110 may enable (or cause a corresponding mobile device to enable) the most suitable or preferred hotspot. For example, if two mobile devices 120 have a mobile hotspot available, the one with the most amount of unused bandwidth can be selected for enablement. Other selection criteria may be used as well instead or in combination with this example.

According to an embodiment, digital assistant 110 may disable (or cause disabling of, by communicating an instruction to a mobile device 120) mobile hotspot 125 based on any one or more of the following: disconnecting from mobile hotspot 125 (for example, where mobile hotspot 125 is no longer needed by any mobile device); a period of inactivity using mobile hotspot 125 (for example, inactivity by digital assistant 110 or a connected mobile device 120); detecting a specific travel route of vehicle 102 (for example, a route on which mobile device 120A lacks sufficient connectivity to network 130 or where the connection may incur unwanted bandwidth charges); detecting mobile device 120A being used by another user device (for example, digital assistant 110 may disable its connection to mobile hotspot 125 if it detects another mobile device establishing a direct connection independently of digital assistant 110; this may prevent overloading of mobile hotspot 125 and effectively prioritizes the direct connection of a mobile device 120 over a facilitated connection); detecting an intermittent connection on mobile device 120A (for example, digital assistant 110 may then choose a mobile device 120 with a connection to network 130, or use its own connection to network 130; where these other connections are preferable to the mobile hotspot 125 connection of mobile device 120A); detecting potential roaming by mobile device 120A; detecting data usage via mobile hotspot 125 reaching a threshold on mobile device 120A; or detecting a voice command (for example, a voice command of a driver or other user in vehicle 102 instructing that digital assistant disconnects from mobile hotspot 125).

In an embodiment of the invention, digital assistant 110 detects that its own network connection is restored or becomes suitable or preferable to a network connection of mobile device 120A made available via mobile hotspot 125. For example, digital assistant 110 may generally maintain its own network connection. However, this network connection may experience intermittent or permanent loss of connectivity. For example, software or hardware glitches may lead to loss of network connectivity. The network connectivity may also be intentionally disabled by the network operator (for example, during an emergency; or non-payment under service agreements). The network connectivity may also be intentionally disabled by a user for any reason (such as avoid roaming charges or using excessive bandwidth). For instance, the vehicle operator may wish not to share the network connection of digital assistant 110 with any, some, or all vehicle passengers (and their mobile devices).

In these scenarios, digital assistant 110 may regain its lost or disabled network connection. In this scenario, it may be desirable to resume using this network connection, rather than the network connection of mobile device 120A via mobile hotspot 125. Therefore, in an embodiment, digital assistant 110 may disable, or cause the disabling of, mobile hotspot 125, and continue carrying out engagements with mobile devices 120 via its own network connection. In another embodiment, digital assistant 110 may disconnect, or cause disconnection of, mobile one or more mobile devices 120 from mobile hotspot 125, without disabling mobile hotspot 125.

Figure 2:
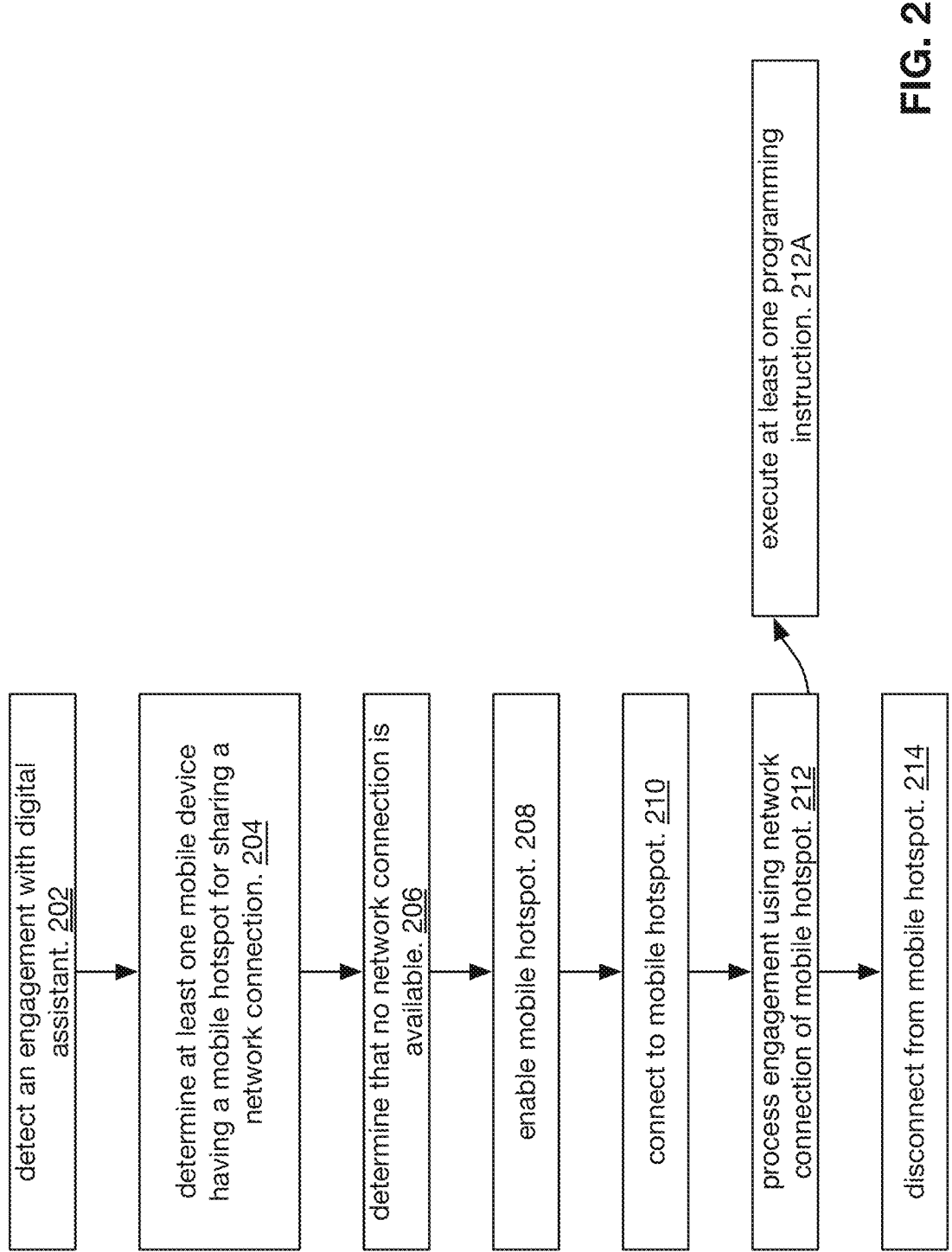
FIG. 2 is a flowchart of an illustrative method 200 for managing an in-vehicle mobile hotspot based on interactions of a vehicle-embedded digital assistant with mobile devices, according to an embodiment of the invention.

FIG. 2 is a flowchart of an illustrative method 200 for managing an in-vehicle mobile hotspot based on interactions of a vehicle-embedded digital assistant with mobile devices, according to an embodiment of the invention. Method 200 may be performed via executing, by one or more computer processors, one or more programming instructions stored on one or more tangible storage devices of the one or more computers. For example, with reference to FIGS. 1 and 2, method 200 may be performed by executing programming instructions of digital assistant 110 using a processor of a computer of vehicle 102 and/or mobile devices 120A. Novel and non-obvious embodiments of the invention need not include all steps of method 200; the method is described in sufficient detail to enable a person of ordinary skill in the art to make and practice several embodiments of the invention without undue experimentation; however, the various embodiments are defined by the claims. Additionally, the steps of method 200 may be performed in any order and in any combination except as otherwise provided and subject only to logical limitations.

Referring now to FIGS. 1 and 2, according to an embodiment of the invention, digital assistant 110 detects (step 202) an engagement with digital assistant 110 by a mobile device 120, such as one or both of mobile device 120B and mobile device 120C. Digital assistant 110 determines (step 202) that responding to (and/or processing) the engagement requires use of a network connection. In an embodiment, the engagement includes one or more programming instructions, and processing the engagement includes executing at least one programming instruction of the engagement.

Digital assistant 110 determines (step 204) that at least one mobile device 120 is capable of providing a mobile hotspot to share a network connection. For example, digital assistant 110 determines that mobile device 120 has a network connection to network 130 and is capable of sharing that connection by providing (or enabling, or allowing access to) mobile hotspot 125. In a related embodiment, digital assistant 110 determines that at least two mobile devices, including mobile device 120A and another mobile device (not shown in FIG. 1), have a network connection and each is capable of providing a mobile hotspot. Digital assistant 110 may select, for mobile hotspot activation, only one of the at least two mobile devices; for example, mobile device 120A may be a preferred or more suitable choice over the other mobile device (not shown) based on connectivity metrics (available bandwidth, reliability, lower cost, and any other metric known or used in the art).

Digital assistant 110 determines (step 206) that no network connection is available to an engaging mobile device. For example, digital assistant 110 determines that mobile device 120B has engaged with digital assistant 110 but neither mobile device 120B nor digital assistant 110 have a network connection. In an embodiment, either or both of these devices may have a network connection, but the network connection may not be suitable (e.g., it cannot accommodate the engagement) or preferable (for example, the network connection may be slower than desired or have a limited bandwidth cap).

In an embodiment, digital assistant 110 enables (step 208) mobile hotspot 125 of mobile device 120A. In an embodiment, enabling mobile hotspot 125 may be performed based on the determination that no network connection is available (For example, as in step 206). In an embodiment, digital assistant 110 may enable (step 208) mobile hotspot 125 by communicating a request to mobile device 120A to prompt a user (for example, via a GUI) to enable mobile hotspot 125. In a related embodiment, digital assistant 110 enables (step 206) mobile hotspot 125 by communicating an instruction to mobile device 120A to enable its mobile hotspot 125 automatically. In a related embodiment, mobile hotspot 125 may already be enabled, in which case digital assistant 110 checks the status of mobile hotspot 125 and confirms that it is enabled.

Digital assistant 110 connects (step 210) to mobile hotspot 125 of the at least one mobile device, i.e., mobile device 120A.

Digital assistant 110 processes (step 212) the engagement, via mobile hotspot 125, using the network connection of mobile device 120A to network 130. For example, the engagement may include a set of programming instructions to search for a text string on an Internet-based search engine. Digital assistant 110 executes (step 212A) the programming instructions, or communicates them to a search engine (for example, server 140) over network 130 using mobile hotspot 125 of mobile device 120.

Digital assistant 110 disconnects (step 214) from mobile hotspot 125. In an embodiment, digital assistant may also disable mobile hotspot 125 (or cause disabling mobile hotspot 125 by communicating an instruction to mobile device 120A to disable the mobile hotspot). In an embodiment, disconnecting from and/or disabling mobile hotspot 125 may be performed in response to digital assistant 110 detecting a trigger event.

Some example embodiments of events that may trigger digital assistant 110 to disconnect from or disable mobile hotspot 125 include, without limitation, the following.

In one embodiment, digital assistant 110 determines that a connected mobile device or the digital assistant disconnecting from the mobile hotspot. For example, digital assistant 110 determines that mobile device 120A has disconnected from digital assistant 110 or is no longer sharing its mobile hotspot 125. As another example, digital assistant 110 determines that mobile device 120B is the only mobile device 120 using mobile hotspot 125; but no longer needs or uses the connection (this may also be triggered if mobile device 120B disconnects from digital assistant 110). This determination can function as a trigger event.

In another embodiment, the trigger event is a period of mobile device 120 inactivity or digital assistant 110 inactivity using the mobile hotspot.

In another embodiment, the trigger event is detecting a specific travel route of the vehicle. For example, along an actual or expected traffic route (i.e., a route being travelled at the time of detecting, or a route that has been scheduled for travelling at some point prior to the detecting), mobile device 120A may be subjected to roaming charges. To avoid incurring roaming charges, this trigger event may cause digital assistant 110 to disable/disconnect from mobile hotspot 125.

In another embodiment, the trigger event is detecting the at least one mobile device being used by another mobile device. For example, digital assistant 110 may determine that mobile device 120A and mobile device 120B are directly tethered. In this case, there may be no need for digital assistant 110 to facilitate enablement and management of mobile hotspot 125. Therefore, digital assistant 110 may disconnect/disable mobile hotspot 125. Disabling mobile hotspot 125 need not break the direct connection between mobile device 120A and mobile device 120B, as the two may be connected by means other than mobile hotspot 125.

In another embodiment, the trigger event may be detecting intermittent network connection on mobile device 120A. This may indicate that mobile device 120A and its mobile hotspot 125 are not of much use to other mobile devices 120 or digital assistant 110. It may not be desirable to connect to it under these conditions.

In another embodiment, the trigger event may be detecting potential roaming by mobile device 120A. It may not be desirable to connect to it under these conditions.

In another embodiment, the trigger event may be detecting data usage reaching a threshold on mobile device 120A. It may not be desirable to connect to it under these conditions.

In another embodiment, the trigger event may be detecting a voice command from user. For example, a vehicle operator or passenger may engage with digital assistant 110 via a voice command to disconnect from or disable mobile hotspot 125.

In another embodiment of the invention, the trigger event may be detecting restoration of a network connection of digital assistant 110. For example, it may be preferable to configure an independent network connection of digital assistant 110 for connecting to network 130. This network connection may associated with a distinct service or data agreement (similar to the practice of cellular network operators providing distinct service or data agreement plans for smart phones, smart tablets, and smart watches with cellular network capability). The network connectivity of digital assistant 110 may be configured as a preferable, most suitable, and/or default mode of connectivity to network 130. When this connection is interrupted, disabled, or degraded, or becomes undesirable for any reason, digital assistant 110 may proactively execute one or more steps of method 200 to switch its network connection to that of a mobile hotspot (for example, mobile hotspot 125).

With continued reference to FIGS. 1 and 2, in a related embodiment, a method for managing an in-vehicle digital assistant may be executed as follows in an exemplary scenario.

In the exemplary scenario, one or more passengers are traveling in vehicle 102, which has an embedded digital assistant 110 (such as IBM Watson Personal Assistant®; all trademarks are properties of their respective owners). The passengers are using their mobile devices 120. One or more of mobile devices 120 is capable of creating a WiFi Hotspot.

At a point during the travelling of vehicle 102, a passenger engages with the personal assistant (for example, via a voice command). If the engagement requires the use of the Internet to respond, digital assistant 110 may tries to identify an available Internet connection. The Internet, here, may constitute or be part of network 130. If no connection is found, a mobile device 120 capable of creating a WiFi hotspot is determined; for example, mobile device 120A and its WiFi hotspot (mobile hostpot 125). If more than one mobile device 120 is present with hotspot capabilities, digital assistant 110 automatically connects to the mobile hotspot of a primary identified mobile device 120A (for example, by querying a sorted list of known and preferred mobile devices 120). Digital assistant 110 asks the passengers, via GUI or other prompts (e.g., a voice command prompt) which mobile device 120 to connect with.

In the above embodiment, digital assistant 110 either requests to enable, or automatically enables, the mobile hotspot of whichever mobile device 120 is identified. The enabled mobile hotspot is later turned off/disabled based on preferences such as: a period of inactivity, fore example 10 minutes without a query or other engagement; a specific route travelled by the vehicle (for example, when driving home); when the mobile device is in use (for example, the connected-to mobile device is a smart phone, and the passenger/user of that phone is on a call); time periods of spotty service or potential roaming charges; data rates reaching a threshold; and after a certain voice command ex. "Watson, turn off my mobile hotspot".

Figure 3:
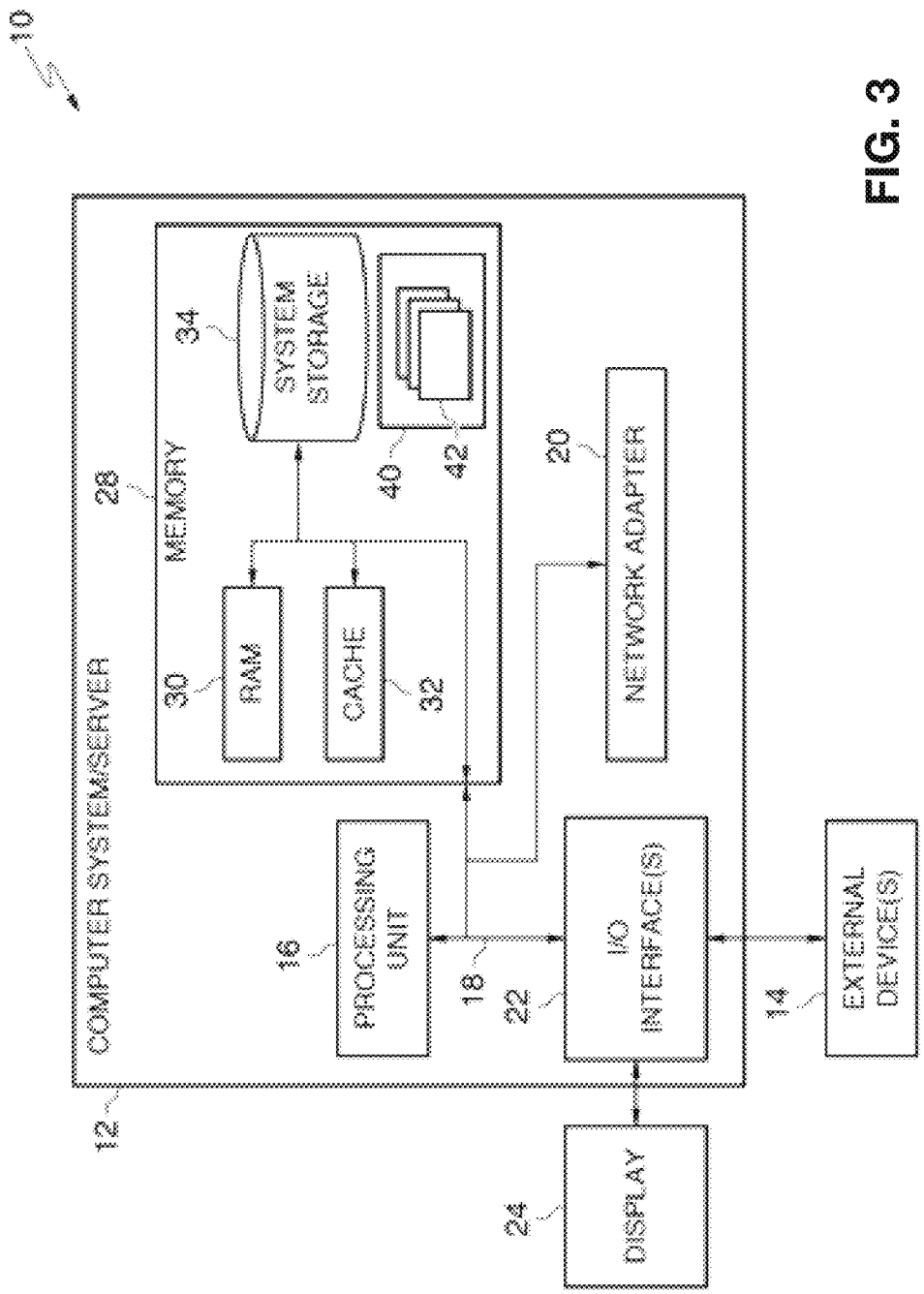
FIG. 3 is a functional block diagram of an illustrative computing device that may be used to implement one or more of the devices of FIG. 1, according to an embodiment of the invention.

Referring now to FIG. 3, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein. Computing device 10 is an example of one or more of the physical and virtual devices of illustrative environment 100 for managing an in-vehicle mobile hotspot, such as a computer embedded in vehicle 102; digital assistant 110; and mobile devices 120 (FIG. 1).

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now generally to embodiments of the present invention, the embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing an in-vehicle mobile hotspot based on interactions of a vehicle-embedded digital assistant with mobile devices, the method comprising:
   detecting an engagement with the digital assistant, wherein responding to the engagement requires use of a network connection with a remote server;
   determining that at least two mobile devices are capable of providing a mobile hotspot to share a network connection with the remote server;
   selecting, for mobile hotspot activation, only one of the at least two mobile devices;
   connecting to the hotspot of the selected mobile device; and
   disabling the hotspot, wherein disabling the hotspot is based on detecting one or more of a specific travel route of the vehicle, a period of selected mobile device inactivity or digital assistant inactivity while connected to the mobile hotspot, the selected mobile device being used by another mobile device, an intermittent network connection on the selected mobile device, or data usage reaching a threshold on the selected mobile device.

2. The method of claim 1, further comprising:
   processing the engagement, via the mobile hotspot, using the network connection.

3. The method of claim 2, wherein the engagement comprises one or more programming instructions, and processing the engagement comprises:
executing at least one programming instruction of the engagement.

4. The method of claim 1, further comprising:
determining that no network connection is available to the selected mobile device.

5. The method of claim 1, further comprising:
determining that no network connection is available to the digital assistant.

6. The method of claim 1, further comprising:
determining that no preferred network connection or no suitable network connection is available to either or both of the selected mobile device and the digital assistant.

7. The method of claim 1, further comprising:
communicating a request to the selected mobile device to prompt a user to enable the mobile hotspot of the selected mobile device.

8. The method of claim 1, further comprising:
communicating an instruction to the selected mobile device to enable the mobile hotspot of the selected mobile device automatically.

9. The method of claim 1, further comprising:
disconnecting from the mobile hotspot.

10. The method of claim 1, further comprising:
communicating an instruction to the selected mobile device to disable the mobile hotspot.

11. A computer program product for managing an in-vehicle mobile hotspot based on interactions of a vehicle-embedded digital assistant with mobile devices, the computer program product comprising a non-transitory tangible storage device having program code embodied therewith, the program code executable by a processor of a computer to perform a method, the method comprising:
detecting an engagement with the digital assistant, wherein responding to the engagement requires use of a network connection with a remote server;
determining that at least two mobile devices are capable of providing a mobile hotspot to share a network connection with the remote server;
selecting, for mobile hotspot activation, only one of the at least two mobile devices;
connecting to the hotspot of the selected mobile device; and
disabling the hotspot, wherein disabling the hotspot is based on detecting one or more of a specific travel route of the vehicle, a period of selected mobile device inactivity or digital assistant inactivity while connected to the mobile hotspot, the selected mobile device being used by another mobile device, an intermittent network connection on the selected mobile device, or data usage reaching a threshold on the selected mobile device.

12. The computer program product of claim 11, further comprising:
processing the engagement, by the digital assistant, via the mobile hotspot, using the network connection.

13. The computer program product of claim 12, further comprising performing any one or combination of:
disconnecting from the mobile hotspot; and
communicating an instruction to the selected mobile device to disable the mobile hotspot.

14. A computer system for managing an in-vehicle mobile hotspot based on interactions of a vehicle-embedded digital assistant with mobile devices, comprising:
a processor;
a network adapter; and
a tangible storage device storing programming instructions executable by the processor to perform a method, the programming instructions comprising instructions for:
detecting an engagement with the digital assistant, wherein responding to the engagement requires use of a network connection with a remote server;
determining that at least two mobile devices are capable of providing a mobile hotspot to share a network connection with the remote server;
selecting, for mobile hotspot activation, only one of the at least two mobile devices;
connecting to the hotspot of the selected mobile device; and
disabling the hotspot, wherein disabling the hotspot is based on detecting one or more of a specific travel route of the vehicle, a period of selected mobile device inactivity or digital assistant inactivity while connected to the mobile hotspot, the selected mobile device being used by another mobile device, an intermittent network connection on the selected mobile device, or data usage reaching a threshold on the selected mobile device.

15. The computer system of claim 14, wherein the programming instructions further comprise programming instructions for:
processing the engagement, by the digital assistant, via the mobile hotspot, using the network connection.

16. The computer system of claim 14, wherein the programming instructions further comprise programming instructions for:
disconnecting from the mobile hotspot; and
communicating an instruction to the selected mobile device to disable the mobile hotspot.

* * * * *